(12) United States Patent
Zhang et al.

(10) Patent No.: US 12,726,589 B2
(45) Date of Patent: Sep. 1, 2026

(54) USE OF NON-3GPP ADVANCED VIDEO CODECS WITH NATIVE DIALERS

(71) Applicant: T-Mobile USA, Inc., Bellevue, WA (US)

(72) Inventors: Lin Zhang, Overland Park, KS (US); Kun Lu, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 421 days.

(21) Appl. No.: 18/348,632

(22) Filed: Jul. 7, 2023

(65) Prior Publication Data

US 2025/0016286 A1 Jan. 9, 2025

(51) Int. Cl.

*H04N 7/14* (2006.01)
*H04L 65/1101* (2022.01)

(52) U.S. Cl.

CPC ......... *H04N 7/148* (2013.01); *H04L 65/1101* (2022.05)

(58) Field of Classification Search

CPC ...... H04N 7/148; H04N 7/14; H04L 65/1101; H04L 65/1016; H04L 65/1069

See application file for complete search history.

(56) References Cited

U.S. PATENT DOCUMENTS

2021/0112109 A1* 4/2021 Lu .................... H04L 65/1104
2023/0074939 A1 3/2023 Do et al.

OTHER PUBLICATIONS

Search Report for European Application No. 24185961.0, Dated Oct. 8, 2024, 12 pages.

* cited by examiner

*Primary Examiner* — Yosef K Laekemariam
(74) *Attorney, Agent, or Firm* — Lee & Hayes, P.C.

(57) ABSTRACT

User equipment (UEs) described herein are configured to determine whether a non-Third Generation Partnership Project (non-3GPP) advanced video codec is available for a video call initiated through a native dialer, exchange indicia of that availability through session description protocol (SDP) messages, and when the non-3GPP advanced video codec is available, utilize the non-3GPP advanced video codec.

18 Claims, 5 Drawing Sheets

USE OF NON-3GPP ADVANCED VIDEO CODECS WITH NATIVE DIALERS

BACKGROUND

As video calling has grown in popularity, several video codecs have been developed for use with video calls. Several of these video codecs have been standardized with the Third Generation Partnership Project (3GPP), such as the H.264 and H.265 advanced video codecs. Other 3GPP advanced video codecs, such as H.266 and H.267 are in development. Other video codecs have also proved popular, including the AOMedia Video 1 (AV1) codec, which is not standardized by the 3GPP. Some of these other video codecs, such as AV1, are used for video calls over telecommunications networks by third-party applications. 3GPP advanced video codecs, on the other hand, are used by native dialers of user equipment (UEs) of telecommunications networks. Often, better bearers, such as guaranteed bit rate (GBR) bearers are available to native dialers, but not to third-party applications.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure is directed in part to user equipment (UEs) configured to determine whether a non-Third Generation Partnership Project (non-3GPP) advanced video codec is available for a video call initiated through a native dialer, exchange indicia of that availability through session description protocol (SDP) messages, and, when the non-3GPP advanced video codec is available, utilize the non-3GPP advanced video codec. Because the video call is initiated with a native dialer rather than a third-party application, it may be assigned a GBR bearer for the video call. Any video calls initiated with the third-party application, on the other hand, may be assigned non-GBR bearers. In various implementations, the originating UE may send the indicator of non-3GPP advanced video codec availability as part of a ranked list of available video codecs in an SDP offer, and the terminating UE may respond with a selection from that list of one or more of the video codecs in the list, also ranked, in an SDP answer. When the non-3GPP advanced video codec is the highest ranked video codec in the SDP offer and is available at both UEs, it is used for the video call between the UEs.

In some implementations, the non-3GPP advanced video codec (e.g., AOMedia Video 1 (AV1)) may have better performance characteristics in one or more performance tests than other video codecs (e.g., H.264, H.265) and may be used in preference to those other video codecs when available to the UEs. In one implementation, where transcoding can be performed between the non-3GPP advanced video codec and another video codec by, e.g., a media gateway, the non-3GPP advanced video codec may be used by any of the UEs which it is available to, even if it is not available to both UEs.

Figure 1:
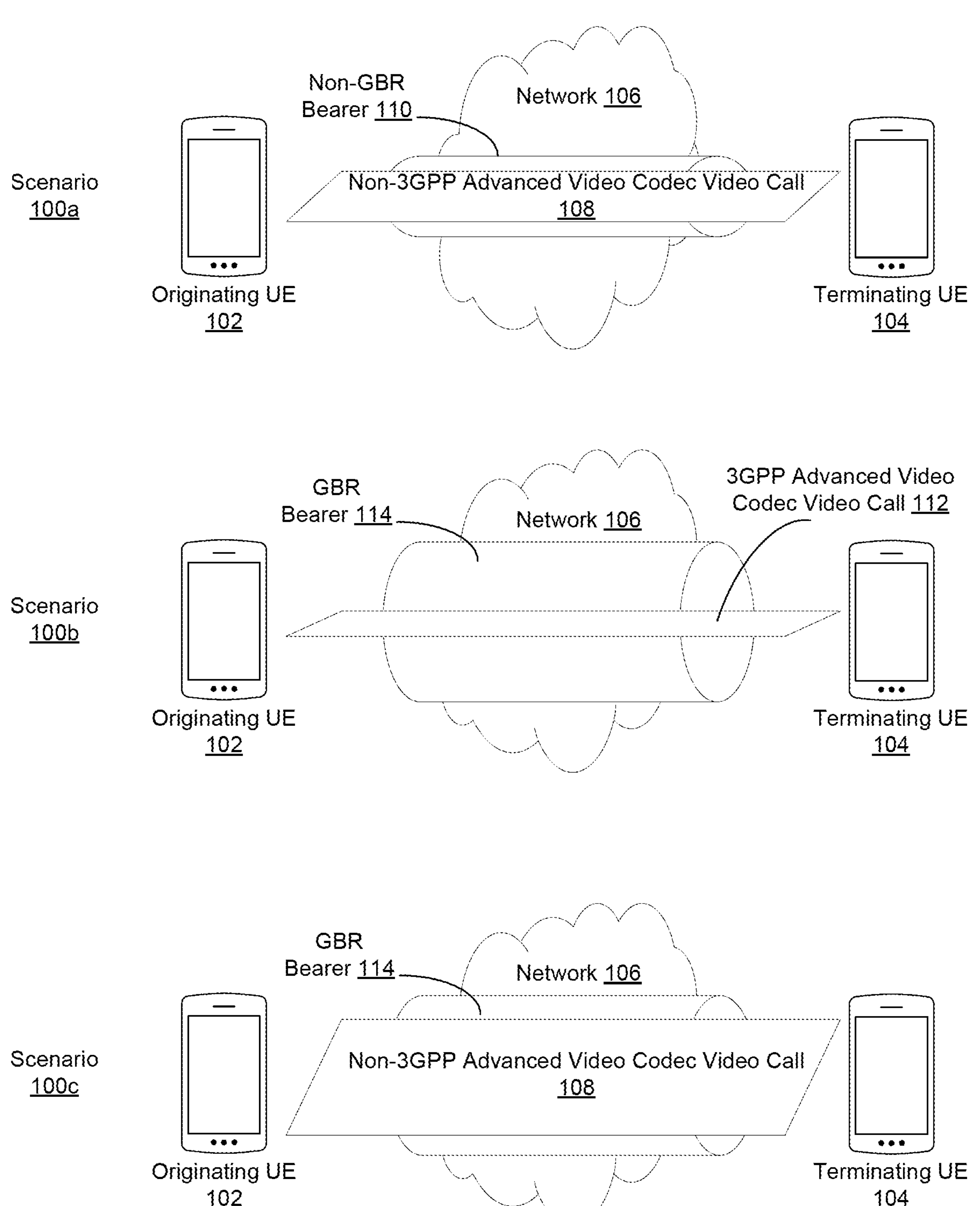
FIG. 1 is a diagram of example scenarios using different bearers and video codecs in video calls between an originating UE and a terminating UE.

FIG. 1 is a diagram of example scenarios 100*a*, 100*b*, and 100*c* using different bearers and video codecs in video calls between an originating UE and a terminating UE. As illustrated in these scenarios 100*a*-100*c*, a UE originating a video call ("originating UE") 102 is connected to a UE terminating the video call ("terminating UE") 104 over a network 106. In scenario 100*a*, the originating UE 102 and terminating UE 104 engage in a video call using a non-3GPP advanced video codec 108 over a non-GBR bearer 110. In scenario 100*b*, the originating UE 102 and terminating UE 104 engage in a video call using a 3GPP advanced video codec 112 over a GBR bearer 114. And in scenario 100*c*, the originating UE 102 and terminating UE 104 engage in a video call using of a non-3GPP advanced video codec 108 over a GBR bearer 114.

Figure 3:
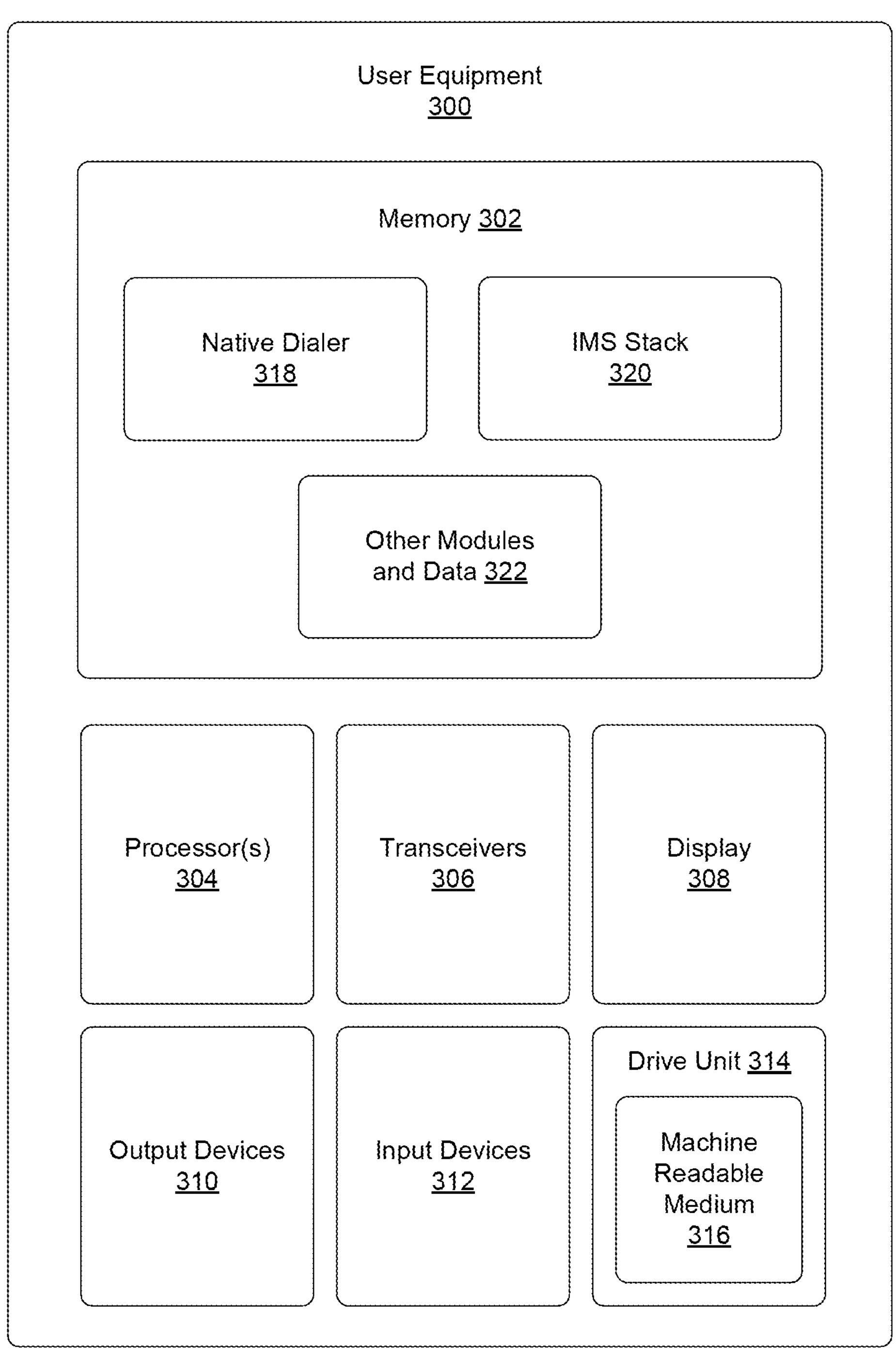
FIG. 3 is a schematic diagram of an example system architecture of a UE that is configured to originate or terminate video calls initiated through a native dialer and utilizing a non-3GPP advanced video codec.

In various implementations, each of the originating UE 102 and the terminating UE 104 may each be any sort of wireless communication device. The UE 102/UE 104 may be a mobile device, such as a cell phone, a watch, goggles, glasses, an Internet-of-Things (IoT) device, a tablet computer, a laptop computer, a personal computer (PC), or any sort of computing device capable of mobility and wireless communication. An example architecture for a UE 102/UE 104 is illustrated in FIG. 3 and described below in detail with reference to that figure.

Each of originating UE 102 and terminating UE 104 may be configured with a native dialer for video calls and an Internet Protocol (IP) Multimedia Subsystem (IMS) stack for establishing packet-based communications. The UEs 102 and 104 may have other software and firmware as well, such as third-party applications, operating systems, other native communication clients, other network stacks, etc.

In various implementations, the native dialers may or may not be aware of non-3GPP advanced video codec availability. In some examples, when a user interacts with the originating UE 102 to initiate a video call, the native dialer sends an instruction to the IMS stack to initiate the video call, and the native dialer is unaware of the video codec selected by the IMS stack for the video call. In other examples, the native dialer of the originating UE 102 may request use of the non-3GPP advanced video codec when instructing the IMS stack to initiate the video call. In yet other examples, the native dialer of the originating UE 102 may be configured with a setting indicating whether the non-3GPP advanced video codec is available or may query another component of the originating UE 102 for availability of the non-3GPP advanced video codec and, when instructing the IMS stack to initiate the video call, may instruct the IMS stack to indicate availability of the non-3GPP advanced video codec.

The IMS stack of the originating UE 102 receives instructions to initiate a video call from the native dialer and, optionally, either a request or an instruction to specify the non-3GPP advanced video codec among the ranked list of video codecs. The IMS stack can include, as part of its configuration, the non-3GPP advanced video codec or a setting indicating whether the originating UE 102 has the non-3GPP advanced video codec. Such a configuration may be part of a build or update of the IMS tack and may be updated when the IMS stack is updated. As will be described in greater detail, the list of ranked video codecs will be included in a session initiation protocol (SIP) message exchange with the terminating UE 104. The terminating UE 104 may be specified in the instructions from the native dialer as, e.g., the called party of the video call. The SIP message exchange may identify the highest ranked video codec, which may or may not be the non-3GPP advanced video codec, and that highest ranked video codec is used in conducting the video call. In some implementations, performance thresholds are measured for the video codec during the call and if performance is poor based on those thresholds, the video codec being used may be marked as unavailable or downgraded, and a new SIP message exchange may be triggered that uses an updated video codec ranking.

Figure 2:
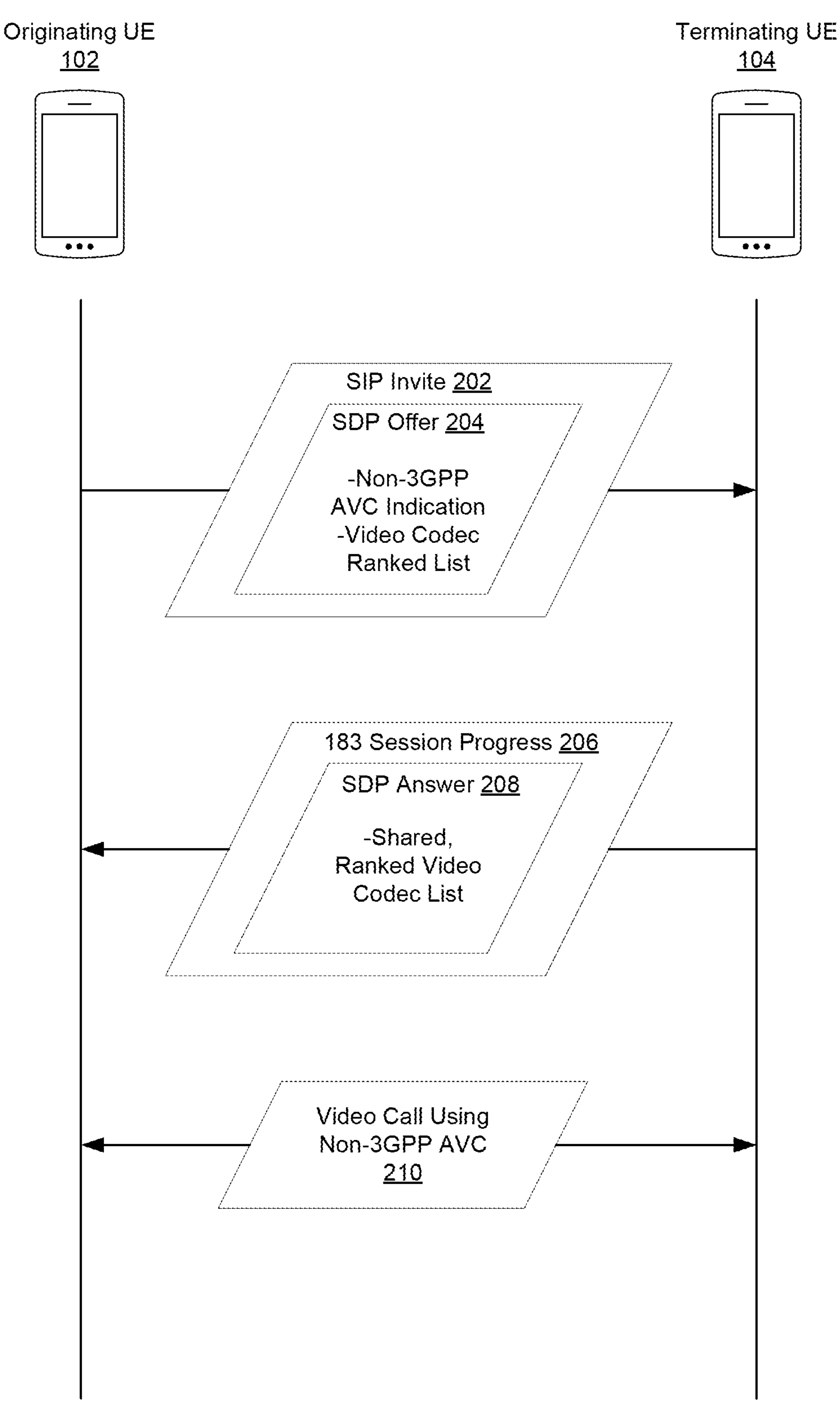
FIG. 2 is a message diagram of an illustrative UEs exchanging message that indicate availability of a non-3GPP advanced video codec and lists of ranked video codecs.

FIG. 2 is a message diagram of an illustrative UEs exchanging message that indicate availability of a non-3GPP advanced video codec and lists of ranked video codecs. As illustrated, a SIP invite message 202 to the terminating UE 104 includes the SDP offer 204, which in turn specifies the list of ranked video codecs. The list of ranked video codecs may include an indicator of the availability of the non-3GPP advanced video codec (e.g., the specification of that codec as part of the ranked list) and other video codecs. The SDP offer 204 may also include video codec parameters for one or more of the video codecs (e.g., when the non-3GPP advanced video codec is AV1, the SDP offer 204 may include AV1 parameters). The SDP offer 204 may conform to 3GPP standards except for the inclusion of non-3GPP advanced video codec(s) in the ranked list of video codecs along with 3GPP video codecs.

In various implementations, the terminating UE 104 may respond, as part of a 183 session progress message 206, or 200 (OK) message if 183 is not used, with the SDP answer 208. The SDP answer 208 may also conform to 3GPP standards except for the inclusion of non-3GPP advanced video codec(s) in the ranked list of video codecs along with 3GPP video codecs. The ranked list included in the SDP answer 208 may be a subset of the ranked list in the SDP offer 204, listing only those video codecs available to both UEs 102 and 104, or may be a single highest ranked one of the video codecs in the SDP offer 204 that is also available to the terminating UE 104.

Following the exchange of SIP messages 202 and 206, the UEs 102 and 104 may utilize at 210 the highest ranked one of the mutually available video codecs.

Returning to FIG. 1, between the messages of the SIP exchange, an IMS stack of the terminating UE 104 may receive the SDP offer and determine, based on a configuration of the IMS stack of the terminating UE 104, which of the ranked video codecs specified in the SDP offer are available to the terminating UE 104. The IMS stack of the terminating UE 104 may then select the highest ranked one of the ranked video codecs specified in the SDP offer that is available to the terminating UE 104. Alternatively, the IMS stack of the terminating UE 104 may determine which ones of the ranked video codecs specified in the SDP offer are available to the terminating UE 104. That/those selected/determined video codec(s) are then specified by the IMS stack of the terminating UE 104 in the SDP answer and the SDP answer is included in a return SIP message, such as the 183 session progress message mentioned above.

In various implementations, the outcome of the SIP message exchange is either an identified one of the video codecs that is available to both the originating UE 102 and the terminating UE 104 and is the highest ranked one of the mutually available video codecs, or a ranked list of mutually available video codecs. In both circumstances the same video codec may be used; in the latter example, backup alternatives are defined if they are needed as fallbacks. Using the selected video codec, the UEs 102 and 104 continue the video call through further SIP messaging and network messaging.

In various implementations, the video codecs listed in the ranked lists of video codecs may include any video codecs, such as AV1 and other non-3GPP advanced video codecs, as well as H.264 (also known as "AVC"—"Advanced Video Codec"), H.265 (also known as "HEVC"—"High-Efficiency Video Codec"), H.266, H.267, and other 3GPP advanced video codecs. These examples are not meant to be exhaustive, however, and other video codecs-past, current, and future—are to be considered included among the examples.

As further illustrated in FIG. 1, the originating UE 102 and terminating UE 104 are connected by network 106, which may be any sort of telecommunication network that includes one or more wireless access networks. Among the operations performed by the access networks of network 106 are allocation of bearers for wireless communications. Each bearer in turn may be associated with a quality of service (QOS), which may be specified by, e.g., a QoS Class Identifier (QCI) or Fifth Generation (5G) QoS Identifier (5QI). These QCI or 5QI may be associated with a GBR and may have other priority or quality characteristics. An example portion of a QoS table, defined in 3GPP 23.501, Release 17, is as follows:

| 5QI Value | Resource Type | Default Priority Level | Packet Delay Budget (NOTE 3) | Packet Error Rate | Default Maximum Data Burst Volume (NOTE 2) | Default Averaging Window | Example Services |
|---|---|---|---|---|---|---|---|
| 1 | GBR | 20 | 100 ms (NOTE 11, NOTE 13) | $10^{-2}$ | N/A | 2000 ms | Conversational Voice |
| 2 | (NOTE 1) | 40 | 150 ms (NOTE 11, NOTE 13) | $10^{-3}$ | N/A | 2000 ms | Conversational Video (Live Streaming) |
| 3 | | 30 | 50 ms (NOTE 11, NOTE 13) | $10^{-3}$ | N/A | 2000 ms | Real Time Gaming, V2X messages (see TS 23.287 [121]). |

-continued

| 5QI Value | Resource Type | Default Priority Level | Packet Delay Budget (NOTE 3) | Packet Error Rate | Default Maximum Data Burst Volume (NOTE 2) | Default Averaging Window | Example Services |
|---|---|---|---|---|---|---|---|
| | | | | | | | Electricity distribution-medium voltage, Process automation monitoring |
| 4 | | 50 | 300 ms (NOTE 11, NOTE 13) | $10^{-6}$ | N/A | 2000 ms | Non-Conversational Video (Buffered Streaming) |
| 65 (NOTE 9, NOTE 12) | | 7 | 75 ms (NOTE 7, NOTE 8) | $10^{-2}$ | N/A | 2000 ms | Mission Critical user plane Push To Talk voice (e.g. MCPTT) |
| 66 (NOTE 12) | | 20 | 100 ms (NOTE 10, NOTE 13) | $10^{-2}$ | N/A | 2000 ms | Non-Mission-Critical user plane Push To Talk voice |
| 67 (NOTE 12) | | 15 | 100 ms (NOTE 10, NOTE 13) | $10^{-3}$ | N/A | 2000 ms | Mission Critical Video user plane |
| 75 (NOTE 14) | | | | | | | |
| 71 | | 56 | 150 ms (NOTE 11, NOTE 13, NOTE 15) | $10^{-6}$ | N/A | 2000 ms | "Live" Uplink Streaming (e.g. TS 26.238 [76]) |
| 72 | | 56 | 300 ms (NOTE 11, NOTE 13, NOTE 15) | $10^{-4}$ | N/A | 2000 ms | "Live" Uplink Streaming (e.g. TS 26.238 [76]) |
| 73 | | 56 | 300 ms (NOTE 11, NOTE 13, NOTE 15) | $10^{-8}$ | N/A | 2000 ms | "Live" Uplink Streaming (e.g. TS 26.238 [76]) |
| 74 | | 56 | 500 ms (NOTE 11, NOTE 15) | $10^{-8}$ | N/A | 2000 ms | "Live" Uplink Streaming (e.g. TS 26.238 [76]) |
| 76 | | 56 | 500 ms (NOTE 11, NOTE 13, NOTE 15) | $10^{-4}$ | N/A | 2000 ms | "Live" Uplink Streaming (e.g. TS 26.238 [76]) |
| 5 | Non-GBR | 10 | 100 ms NOTE 10, NOTE 13) | $10^{-6}$ | N/A | N/A | IMS Signaling |
| 6 | (NOTE 1) | 60 | 300 ms (NOTE 10, NOTE 13) | $10^{-6}$ | N/A | N/A | Video (Buffered Streaming) TCP-based (e.g. www, e-mail, chat, ftp, p2p file sharing, progressive video, etc.) |
| 7 | | 70 | 100 ms (NOTE 10, NOTE 13) | $10^{-3}$ | N/A | N/A | Voice, Video (Live Streaming) Interactive Gaming |
| 8 | | 80 | 300 ms (NOTE 13) | $10^{-6}$ | N/A | N/A | Video (Buffered Streaming) TCP-based (e.g. www, e-mail, chat, ftp, p2p file sharing, progressive video, etc.) |
| 9 | | 90 | | | | | |
| 10 | | 90 | 1100 ms (NOTE 13) (NOTE 17) | $10^{-6}$ | N/A | N/A | Video (Buffered Streaming) TCP-based (e.g. www, e-mail, chat, ftp, p2p file sharing, progressive video, etc.) and any service that can be used over satellite access type with these characteristics |

Applying such a table to the scenarios 100*a*, 100*b*, and 100*c*, the non-GBR bearer 110 could have a 5QI value of 7 (see table above), and the GBR bearer 114 could have a 5QI value of 2 (see table above). User experience of a high-quality video codec, such as the non-3GPP advanced video codec shown in 100*a*, may suffer when a non-GBR bearer 110 is used. The best user experience, shown at 100*c*, involves both a high-quality bearer (e.g., GBR bearer 114) and a high-quality video codec (e.g., non-3GPP advanced video codec 108). Third party applications are limited to scenario 100*a*-they will be allocated a non-GBR/high 5QI value bearer 110, regardless of the quality and performance of the video codec they use. Video calls only receive a GBR bearer 114 when a native dialer is used, and scenarios 100*b* and 100*c* show the difference in outcome based on the quality/performance of the video codec 108/112.

In some implementations, a network operator associated with the network 106 may also provide updates to the originating UE 102 and terminating UE 104, such as carrier configuration ("carrier config") updates. Such carrier config updates can be used, for example, to instruct the originating UE 102 and terminating UE 104 to cease using the non-3GPP advanced video codec, even when it would otherwise be available. The carrier config updates can also instruct the originating UE 102 and terminating UE 104 to resume use of the non-3GPP advanced video codec.

In further implementations, the network 106 may include a media gateway capable of transcoding between the non-3GPP advanced video codec and another video codec such that one of the originating UE 102 and terminating UE 104 can use the non-3GPP advanced video codec even if it is only available to that UE and not the other.

FIG. 3 is a schematic diagram of an example system architecture of a UE 300 that is configured to originate or terminate video calls initiated through a native dialer and utilizing a non-3GPP advanced video codec. The UE 300 can be an example of the UE 102 or the UE 104. The UE 300 can have at least one memory 302, processor(s) 304, one or more transceivers 306, a display 308, output devices 310, input devices 312, and/or a drive unit 314 including a machine readable medium 316. The memory 302 may include a native dialer 318, an IMS stack 320, and other modules and data 322.

In various examples, the memory 302 can include system memory, which may be volatile (such as RAM), non-volatile (such as ROM, flash memory, etc.) or some combination of the two. The memory 302 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information and which can be accessed by the UE 300. Any such non-transitory computer-readable media may be part of the UE 300.

The memory 302 can include one or more software or firmware elements, such as computer-readable instructions that are executable by the one or more processors 304. For example, the memory 302 can store computer-executable instructions associated with native dialer 318, IMS stack 320, and other modules and data 322. The native dialer 318 may be used by a user of the UE 300, when originating a video call, to initiate the video call by identifying a called party and instructing the IMS stack 320 to initiate the video call to a terminating UE of the called party. The IMS stack 320, whether of an originating UE 300 or a terminating UE 300, may engage in SIP message exchanges to establish the video call, including an exchange of SDP messages identifying the video codec to be used. The other modules and data 322 can include a UE platform, operating system, and applications, and data utilized by the platform, operating system, and applications.

In various examples, the processor(s) 304 can be a CPU, a graphics processing unit (GPU), or both CPU and GPU, or any other type of processing unit. Each of the one or more processor(s) 304 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 304 may also be responsible for executing all computer applications stored in the memory 302, which can be associated with types of volatile (RAM) and/or nonvolatile (ROM) memory.

The transceivers 306 can include modems, interfaces, antennas, and/or other components that perform or assist in exchanging wireless communications with base stations, Wi-Fi access points, or otherwise implement connections with one or more networks, such as network 106.

The display 308 can be a liquid crystal display or any other type of display commonly used in UEs. For example, the display 308 may be a touch-sensitive display screen and can thus also act as an input device or keypad, such as for providing a soft-key keyboard, navigation buttons, or any other type of input.

The output devices 310 can include any sort of output devices known in the art, such as the display 308, speakers, a vibrating mechanism, and/or a tactile feedback mechanism. Output devices 310 can also include ports for one or more peripheral devices, such as headphones, peripheral speakers, and/or a peripheral display.

The input devices 312 can include any sort of input devices known in the art. For example, input devices 312 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 316 of a drive unit 314 can store one or more sets of instructions, such as software or firmware, that embodies any one or more of the methodologies or functions described herein. The instructions can also reside, completely or at least partially, within the memory 302, processor(s) 304, and/or transceiver(s) 306 during execution thereof by the UE 300.

Figure 4:
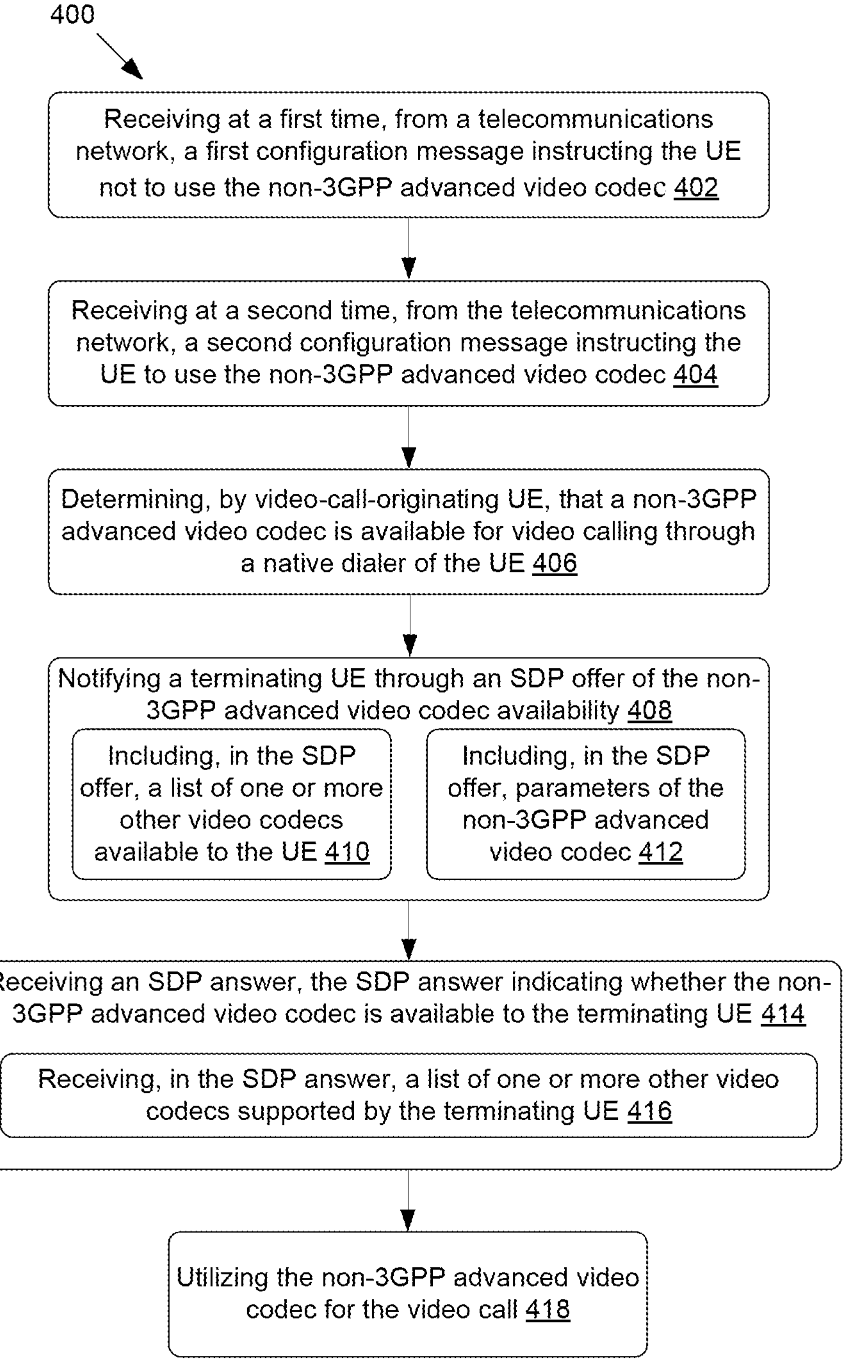
FIG. 4 is a flow diagram of an illustrative process for determining by an originating UE that a non-3GPP advanced video codec is available for video calls with a native dialer and informing a terminating UE of the availability.
Figure 5:
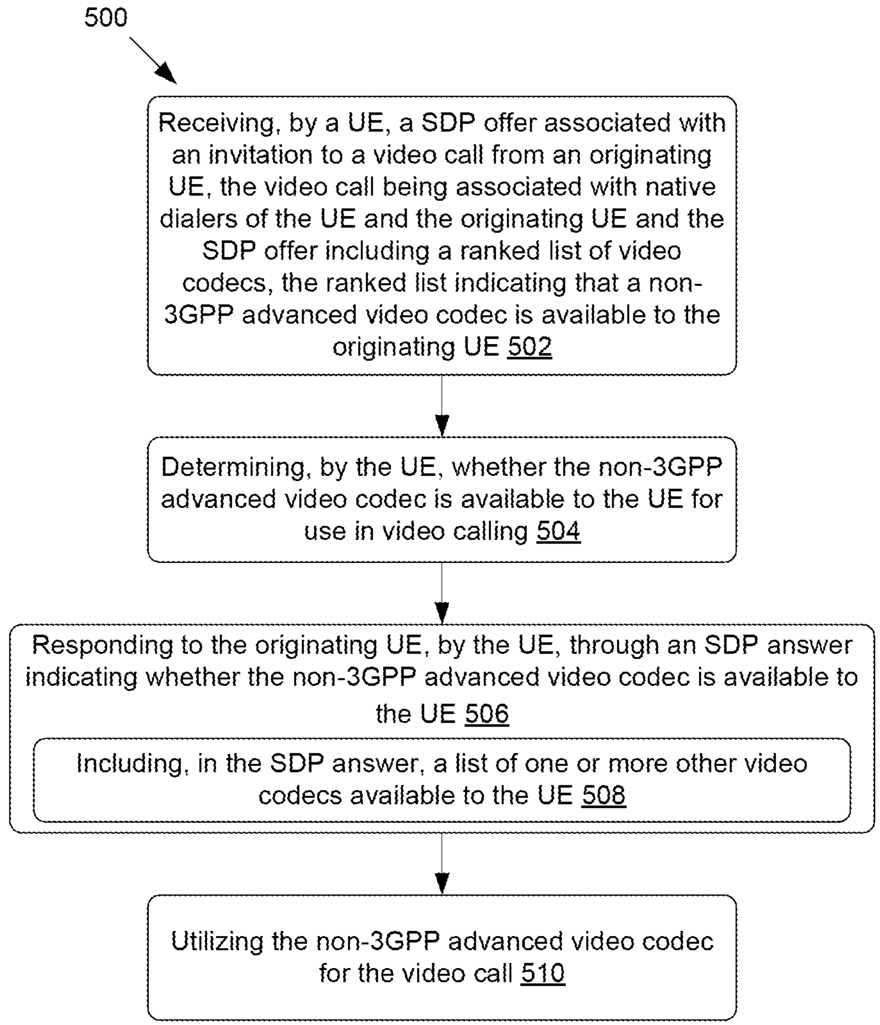
FIG. 5 is a flow diagram of an illustrative process for receiving a message indicating the availability of the non-3GPP advanced video codec to the originating UE and determining whether the non-3GPP advanced video codec is available to the terminating UE.

FIGS. 4 and 5 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations.

Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 4 is a flow diagram of an illustrative process 400 for determining by an originating UE that a non-3GPP advanced video codec is available for video calls with a native dialer and informing a terminating UE of the availability. At 402, an originating UE may receive, at a first time, from a telecommunications network connected to the originating UE, a first configuration message instructing the originating UE not to use a non-3GPP advanced video codec. In some implementations, the non-3GPP advanced video codec may be an AV1 codec. At 404, the originating UE may receive, at a second time later than the first time, from the telecommunications network connected to the originating UE, a second configuration message instructing the originating UE to use the non-3GPP advanced video codec. If the originating UE initiates a video call between the first and second times, the non-3GPP advanced video codec would not be available to the originating UE by reason of the first configuration message. While the operations 402 and 404 are shows before the other operations of FIG. 4, it is to be understand that operations 402 and 404 may also occur at other times, such as after the other operations of FIG. 4.

At 406, when originating a video call through a native dialer of the originating UE, the originating UE determines that the non-3GPP advanced video codec is available to the originating UE for video calling though the native dialer.

At 408, through a SDP offer, the originating UE notifies a terminating UE for the video call of the availability of the non-3GPP advanced video codec to the originating UE. At 410, the notifying further comprises including, in the SDP offer, a list of one or more other video codecs available to the UE. The one or more other video codecs may include H.264, H.265, H.266, or H.267. In some implementations, the SDP answer indicates that the non-3GPP advanced video codec is not available to the terminating UE and specifies at least one of the one or more other video codecs as available to the terminating UE. At 412, the notifying further comprises including, in the SDP offer, one or more parameters of the non-3GPP advanced video codec.

At 414, the originating UE receives an SDP answer from the terminating UE. The SDP answer indicates whether the non-3GPP advanced video codec is available to the terminating UE. At 416, when the non-3GPP advanced video codec is not available to the terminating UE, the receiving further comprises receiving, in the SDP answer, a list of one or more other video codecs supported by the terminating UE. In other examples, when the terminating UE indicates that the non-3GPP advanced video codec is available to the terminating UE, the non-3GPP advanced video codec is the only video codec mentioned in the SDP answer. Further, in some examples, the SDP answer may include one or more parameters of the non-3GPP advanced video codec.

At 418, when the non-3GPP advanced video codec is available to both the originating UE and the terminating UE, the originating UE utilizes the non-3GPP advanced video codec for the video call. In some implementations, when the non-3GPP advanced video codec is not available to the terminating UE, the originating UE still utilizes the non-3GPP advanced video codec for the video call. In such implementations, a transcoding gateway of a telecommunications network connecting the UE and terminating UE transcodes between the non-3GPP advanced video codec and a video codec used by the terminating UE. In other implementations, when the non-3GPP advanced video codec is not available to the terminating UE, the originating UE utilizes the at least one of the one or more other video codecs.

Further, the video call may be initiated using a bearer with a guaranteed bit rate because the video call is associated with the native dialer of the originating UE. Another video call, initiated using a third-party application of the originating UE and using the non-3GPP advanced video codec, would be initiated using a bearer that does not have a guaranteed bit rate.

FIG. 5 is a flow diagram of an illustrative process 500 for receiving a message indicating the availability of the non-3GPP advanced video codec to the originating UE and determining whether the non-3GPP advanced video codec is available to the terminating UE. At 502, a terminating UE receives a SDP offer associated with an invitation to a video call from an originating UE, the video call being associated with native dialers of the terminating UE and the originating UE. The SDP offer includes a ranked list of video codecs, the ranked list indicating that a non-3GPP advanced video codec is available to the originating UE. The non-3GPP advanced video codec may be an AV1 codec.

At 504, the terminating UE determines whether the non-3GPP advanced video codec is available to the UE for use in video calling.

At 506, the terminating UE responds to the originating UE through an SDP answer indicating whether the non-3GPP advanced video codec is available to the UE. At 508, the responding further comprises including, in the SDP answer, a list of one or more other video codecs available to the UE. In some implementations, the SDP answer indicates that the non-3GPP advanced video codec is not available to the terminating UE and specifies at least one of the one or more other video codecs as available to the UE.

At 510, when the non-3GPP advanced video codec is available to both the terminating UE and the originating UE, the terminating UE utilizes the non-3GPP advanced video codec for the video call. In implementations in which the non-3GPP advanced video codec is not available, the UEs may utilize the at least one of the one or more other video codecs.

Further, the video call may be established using a bearer with a guaranteed bit rate because the video call is associated with the native dialer of the originating UE. Another video call, initiated using a third-party application of the originating UE and using the non-3GPP advanced video codec, would be established using a bearer that does not have a guaranteed bit rate.

Although features and/or methodological acts are described above, it is to be understood that the appended claims are not necessarily limited to those features or acts. Rather, the features and acts described above are disclosed as example forms of implementing the claims.

What is claimed is:

1. A method comprising:

determining, by a user equipment (UE) originating a video call, that a non-Third Generation Partnership Project (non-3GPP) advanced video codec is available to the UE for video calling though a native dialer of the UE;

notifying, by the UE and through a session description protocol (SDP) offer, a terminating UE for the video call of the availability of the non-3GPP advanced video codec to the UE;

receiving, by the UE, an SDP answer from the terminating UE, the SDP answer indicating whether the non-3GPP advanced video codec is available to the terminating UE;

receiving at a first time, from a telecommunications network connected to the UE, a first configuration message instructing the UE not to use the non-3GPP advanced video codec at the UE;

receiving at a second time later than the first time, from the telecommunications network connected to the UE, a second configuration message instructing the UE to use the non-3GPP advanced video codec at the UE; and when the non-3GPP advanced video codec is available to both the UE and the terminating UE, utilizing the non-3GPP advanced video codec for the video call after receiving the second configuration message at the UE.

2. The method of claim 1, wherein the non-3GPP advanced video codec is an AOMedia Video 1 (AV1) codec.

3. The method of claim 1, wherein the notifying further comprises including, in the SDP offer, a list of one or more other video codecs available to the UE.

4. The method of claim 3, wherein the one or more other video codecs include H.264, H.265, H.266, or H.267.

5. The method of claim 3, wherein the SDP answer indicates that the non-3GPP advanced video codec is not available to the terminating UE and specifies at least one of the one or more other video codecs as available to the terminating UE, and the method further comprises using the at least one of the one or more other video codecs for the video call.

6. The method of claim 3, wherein the notifying further comprises including, in the SDP offer, one or more parameters of the non-3GPP advanced video codec.

7. The method of claim 1, wherein the receiving further comprises receiving, in the SDP answer, a list of one or more other video codecs supported by the terminating UE or, when the terminating UE indicates that the non-3GPP advanced video codec is available to the terminating UE, one or more parameters of the non-3GPP advanced video codec.

8. The method of claim 1, wherein the video call is initiated using a bearer with a guaranteed bit rate because the video call is associated with the native dialer of the UE.

9. The method of claim 8, wherein another video call, initiated using a third-party application of the UE and using the non-3GPP advanced video codec, is initiated using a bearer that does not have a guaranteed bit rate.

10. The method of claim 1, wherein the utilizing comprises utilizing the non-3GPP advanced video codec for the video call when the non-3GPP advanced video codec is not available to the terminating UE and a transcoding gateway of a telecommunications network connecting the UE and terminating UE transcodes between the non-3GPP advanced video codec and a video codec used by the terminating UE.

11. A user equipment (UE) comprising:

a processor; and a plurality of programming instructions that, when executed by the processor, cause the UE to perform operations including:

determining that a non-Third Generation Partnership Project (non-3GPP) advanced video codec is available to the UE for video calling though a native dialer of the UE;

notifying, through a session description protocol (SDP) offer, a terminating UE for a video call of the availability of the non-3GPP advanced video codec to the UE;

receiving an SDP answer from the terminating UE, the SDP answer indicating whether the non-3GPP advanced video codec is available to the terminating UE; and when the non-3GPP advanced video codec is available to both the UE and the terminating UE, utilizing the non-3GPP advanced video codec for the video call, wherein the plurality of programming instructions include the native dialer and an Internet protocol (IP) multimedia subsystem (IMS) stack, the native dialer instructing the IMS stack to initiate the video call to the terminating UE, and the IMS stack performing the determining, the notifying, and the receiving.

12. The UE of claim 11, wherein the plurality of programming instructions include the native dialer and an Internet protocol (IP) multimedia subsystem (IMS) stack, the native dialer instructing the IMS stack to initiate the video call to the terminating UE and either instructing the IMS stack to perform the determining or performing the determining and informing the IMS stack of the availability of the non-3GPP advanced video codec, and the IMS stack performing at least the notifying and the receiving.

13. A method comprising:

receiving, by a user equipment (UE), a session description protocol (SDP) offer associated with an invitation to a video call from an originating UE, the video call being associated with native dialers of the UE and the originating UE and the SDP offer including a ranked list of video codecs, the ranked list indicating that a non-Third Generation Partnership Project (non-3GPP) advanced video codec is available to the originating UE;

receiving at a first time, from a telecommunications network connected to the UE, a first configuration message instructing the UE not to use the non-3GPP advanced video codec at the UE;

receiving at a second time later than the first time, from the telecommunications network connected to the UE, a second configuration message instructing the UE to use the non-3GPP advanced video codec at the UE;

determining, by the UE, whether the non-3GPP advanced video codec is available to the UE for use in video calling;

responding to the originating UE, by the UE, through an SDP answer indicating whether the non-3GPP advanced video codec is available to the UE; and when the non-3GPP advanced video codec is available to both the UE and the originating UE, utilizing the non-3GPP advanced video codec for the video call after receiving the second configuration message at the UE.

14. The method of claim 13, wherein the non-3GPP advanced video codec is an AOMedia Video 1 (AV1) codec.

15. The method of claim 13, wherein the responding further comprises including, in the SDP answer, a list of one or more other video codecs available to the UE.

16. The method of claim 15, wherein the SDP answer indicates that the non-3GPP advanced video codec is not available to the UE and specifies at least one of the one or more other video codecs as available to the UE, and the method further comprises utilizing the at least one of the one or more other video codecs for the video call.

17. The method of claim 13, wherein the video call is established using a bearer with a guaranteed bit rate because the video call is associated with the native dialer of the UE.

18. The method of claim 17, wherein another video call, initiated using a third-party application of the originating UE and using the non-3GPP advanced video codec, is established using a bearer that does not have a guaranteed bit rate.

* * * * *